Jan. 22, 1929.
N. E. NORTH
1,699,748
RAILWAY CONTROL SYSTEM
Filed June 24, 1924   3 Sheets-Sheet 2
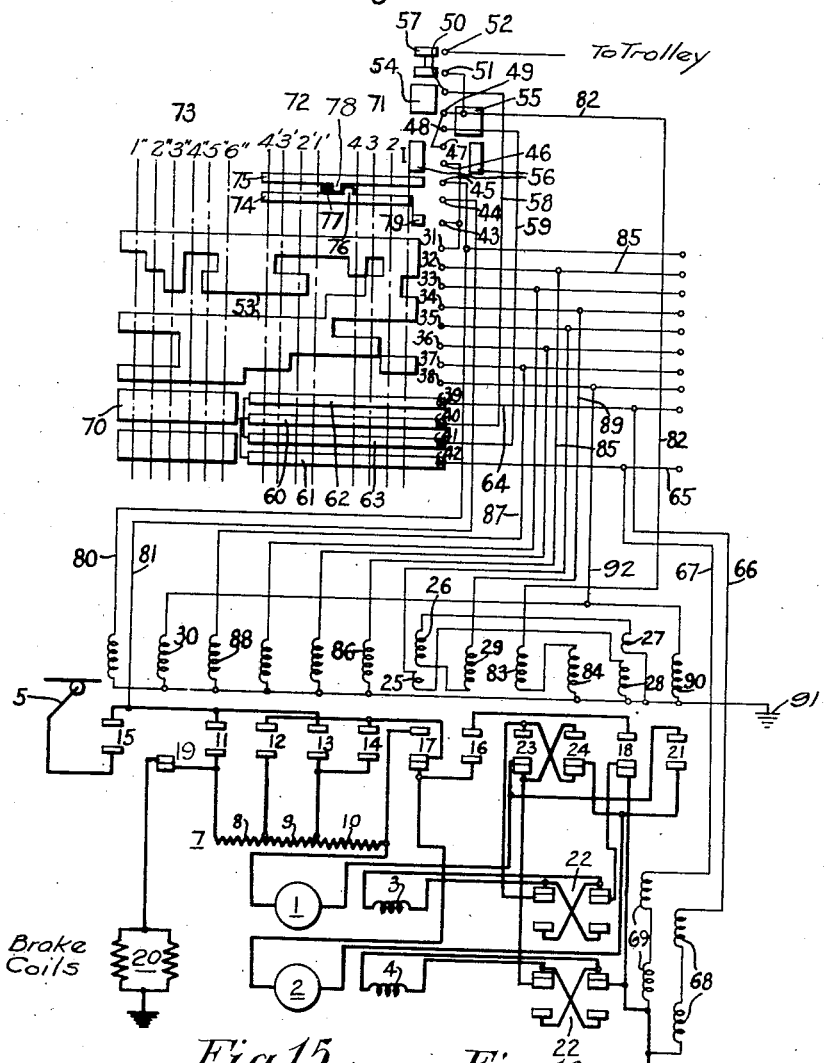
WITNESSES:
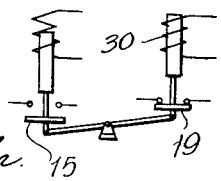
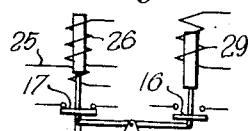
INVENTOR
Norman Entwisle North.
BY
ATTORNEY

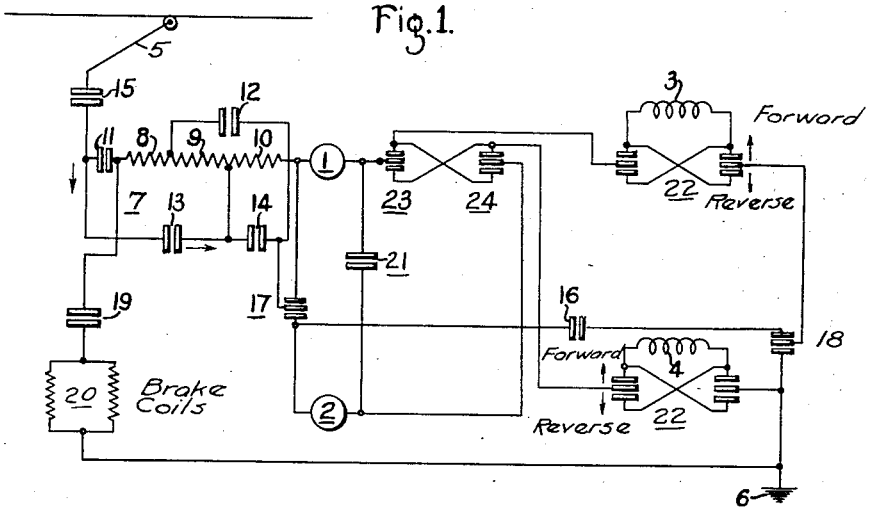

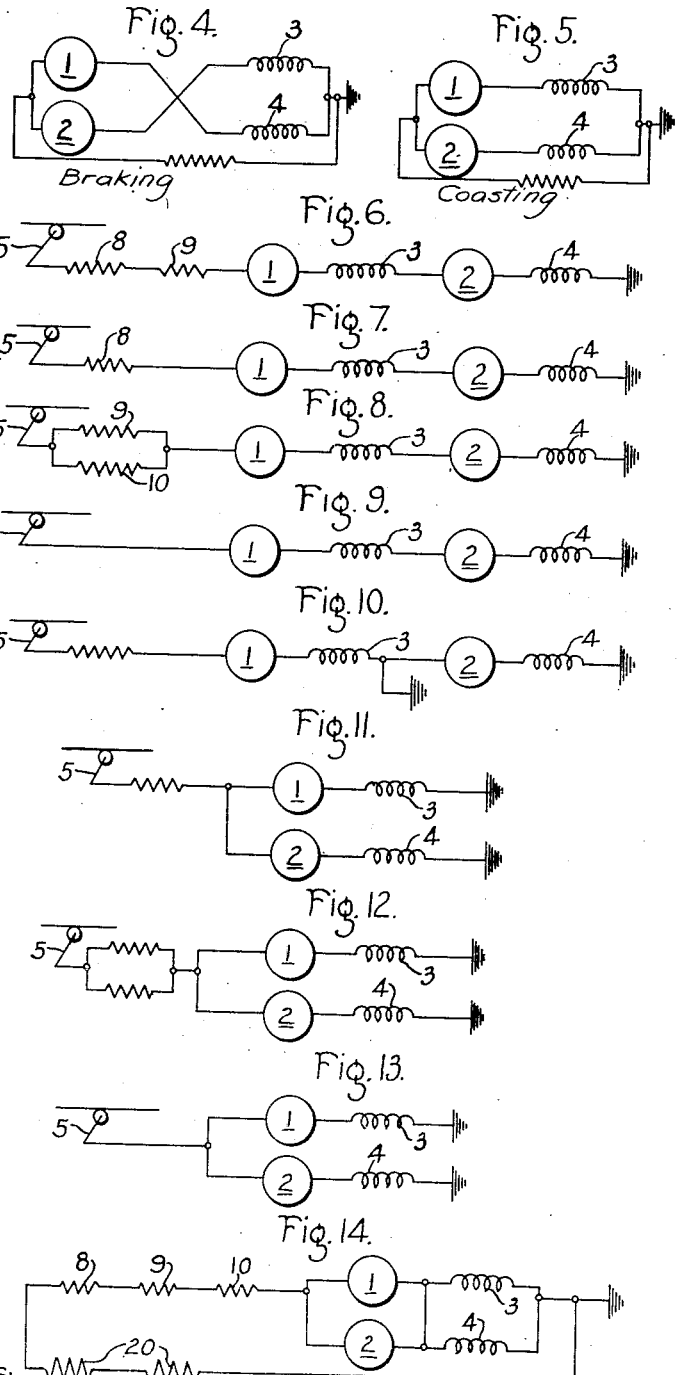

Patented Jan. 22, 1929.

1,699,748

UNITED STATES PATENT OFFICE.

NORMAN ENTWISLE NORTH, OF SALE, ENGLAND, ASSIGNOR TO WESTINGHOUSE ELECTRIC & MANUFACTURING COMPANY, A CORPORATION OF PENNSYLVANIA.

RAILWAY CONTROL SYSTEM.

Application filed June 24, 1924, Serial No. 722,038, and in Great Britain June 28, 1923.

This invention relates to motor control systems and it has particular relation to control systems for electric railway cars and the like.

An object of my invention is to provide for handling the main current remotely so that a plurality of cars may be more effectively controlled in accordance with the well known multiple unit control principle.

For various reasons, the circuit connections for the main current are usually controlled directly by a drum controller which is necessarily of relatively large dimensions and difficult for manual operation in consequence. It has however been proposed to employ electro-magnetically operated or governed contactors for handling the main current, the auxiliary circuits for the contactors being controlled from a master controller. When it has been desired to employ dynamic braking for the motors, the braking circuits have been controlled directly by the master controller since the electro-magnetically governed switches become inoperative upon failure of the supply. The master controller therefore becomes substantially the same size as an ordinary direct operating drum controller. Furthermore with the use of electro-magnetically operated switches and a master controller in railway systems, difficulties arise in connection with the electrical interlock switches which are usually necessary such as for holding in the line switch and for ensuring correct sequence of operation of the contactors for example when changing from power to brake connections and also during transition from series to parallel operation.

According to my invention, the main motor circuits for power and braking are controlled by a plurality of electro-magnetically operated switches or contactors the operation of which is governed by a master controller. Certain of said contactors are of the type having two operative positions. In one of said positions, in which the operating coils are energized by the control circuits and governed by the master controller, the desired accelerating connections of the main motor circuits are made, while in the other position to which the contactors move when the control circuits are de-energized, main circuit connections are made for dynamic braking of the motors which, therefore, takes place automatically if the supply of power to the control circuit fails for any cause. Certain of said contactors are of the type that, when the control circuits are de-energized for any reason, said switches occupy a closed position wherein the main emergency braking circuit above referred to, is completed therethrough, while when the master controller is operated to effect series connection of the motors, said switches are operated to their open positions. Furthermore, the switches controlling transition from series to parallel operation of the motors are provided with both opening and closing coils which are of different relative strengths for interlocking purposes to be hereinafter described.

The master controller is preferably provided with the well known dead man's handle or similar device so that when released the control circuit is opened and the contactors operate as above described to effect braking of the motors. Alternatively, the controller handle may be provided with a spring device for returning it to its "off" or other predetermined position wherein the emergency braking is obtained. Preferably means are provided for including a suitable resistance in the motor circuit for preventing an excessive braking effect.

The master controller is preferably provided with contact members whereby the closing coil of the line switch for the main circuits of the motors is first energized from the source of control current, advantageously through the dead man's handle switch, when such is used. When the controller is moved further round, said coil is energized from that contact of the line switch which is dead when the line switch is open. In this manner, the interlock usually adopted for the line switch in electric railway practice is avoided. Furthermore, the circuit by which the coil of the line switch is maintained energized is preferably taken through a pair of controller rings or segments, one of which is loosely mounted on the control drum and provided with lost motion, the arrangement being such that when the controller is being moved from the "off" position, said segments are electrically connected and the above-mentioned circuit of the line switch completed and that when the controller is moved from any position towards the "off" position, said circuit is broken between said segments.

My invention will be clearly understood upon reference to the accompanying drawings, which illustrates by way of example one complete control system in accordance with my invention, and in which Fig. 1 is a simplified main circuit diagram of a two-motor equipment suitable for a railway car.

Fig. 2 is an electrical diagram of the system illustrated in Fig. 1 together with the control circuits therefor, Fig. 3 is a sequence chart, in conventional form, of the control switches illustrated in Fig. 2, and Figs. 4 to 14, inclusive, are simplified diagrams of the motor circuits in accordance with different control conditions.

Figs. 15 and 16 are diagrammatic views of interlocking members disposed between pairs of switches.

Referring first to Fig. 1 of the drawings, the improved motor control system therein illustrated comprises the armatures 1 and 2 with respective field windings 3 and 4 adapted to be connected between trolley 5 and ground 6, through a variable resistor 7. The resistor 7, in the example illustrated, comprises three sections 8, 9 and 10 which are variably connected in circuit as hereinafter described by means of a plurality of contactors 11, 12, 13 and 14. Other contactors are provided, comprising a line switch 15, a switch 16, commonly known as the J. R. switch, for connecting the motors in series; a switch 17, commonly known as the M switch, for connecting the motors in parallel; a switch 18, commonly known as the G switch, for providing a short circuit connection during transition between series and parallel; a switch 19 (the M. B.' switch) for connecting magnetic brake coils 20 across the motors when the latter are acting as generators for braking purposes.

An equalizing switch 21 (the M. B. switch) connects the armature together during magnetic braking; and respective reversing switches 22, for the fields of the motors, enable the latter to be driven in the forward or the reverse direction. In addition, there are provided switches 23 and 24 (B and B' switches) for cross-connecting the fields of the motors under certain conditions as previously herein set forth. These switches in their de-energized positions provide the aforesaid cross-field connection while in their energized positions direct connection of the fields is established wherein normal running and variable braking can be effected. The M switch 17, the G switch 18 and the cross field connecting switches 23 and 24 are of the two-way type adapted normally to occupy the one or the other of their predetermined respective positions.

The M switch 17 is provided with two operating coils, namely a relatively weak closing coil 25 and a relatively strong opening coil 26. The G switch 18 on the other hand is provided with a relatively weak opening coil 27 and a relatively strong closing coil 28, as is clearly indicated in Fig. 2. The M switch 17 and the J. R. switch 16 are mechanically interlocked so that the energization of the coil 29 of the J. R. switch 16 and the opening coil 26 of the M switch 17 will result in the J. R. switch 16 being closed and the M switch 17 being locked out, that is to say maintained in its open position. The G switch 18 is also capable of being locked out by reason of its opening coil 27 being sufficiently strong for this purpose. However, the closing coil 28 of the G switch 18 is sufficiently strong to effect the closure of the switch even though its opening coil 27 is still energized. On the other hand the closing coil 25 of the M switch 17 is not sufficiently strong to effect the closure of this switch when its opening coil 26 is simultaneously energized. The M. B.' preferably switch 19 is mechanically interlocked with the line switch 15 so that it is closed when the line switch is open, the energization of the operating coil 30 of the M. B.' switch 19 when the line switch is open then serving only to hold this switch more firmly closed.

The contactors may be arranged as a group in each of the vehicles in any convenient position. The switches of each group may be divided into two panels or switch frames each of which is mounted at one end of the resistance tie-bars which thus hold the switching equipment together as a unit, a simple and compact arrangement being thus obtained. The number of heavy cables external to the groups is reduced to a minimum there being a comparatively small number of leads joining the two groups. A master controller is provided at each end of each car through which a plurality of train lines for the control circuits pass so that control for multi-unit operation may be effected from either end of either of the cars.

Referring now more particularly to Fig. 2 of the drawings, the main motor circuits are included in the lower part of this figure and the control switches are arranged together as a group above the main circuits, the operating coils of the switches being disposed immediately above the respective switch contacts. The train lines which pass through the car are disposed above the switch coils and the master controller is shown at the left of these lines.

The master controller is of the usual drum type with a plurality of contact fingers 31 to 52 inclusive and co-operating contact segments 53. The master controller is provided with a reverser drum consisting of "forward" and "reverse" segments 54 and 55 respectively co-operating with contact fingers 48, 49 and 50 and a pair of interlock segments 56. The main controller handle (not shown) is provided with a dead man's handle switch 57 which can only be depressed when the main handle is in the off position. The switch 57 has two contacts which co-operate with the contact fingers 51 and 52. The contact finger 52 is connected directly to the line while the contact finger 51 is connected to the fingers 49 and 47. The reverser interlock segments 56 complete the circuit from the energized contact finger 52 through either of the segments 54 or 55 to the contact finger 31 by which the main controller segments 53 are energized, as will hereinafter appear. When the dead man's switch 57 is closed, either of conductors 58 or 59 becomes energized in accordance with the position of the reverser switch and contact finger 40 or 41 is energized which makes contact in the off and motoring positions of the controller with drum segments 60 and 63. These segments are connected with segments 61 and 62 which, in the off and motoring positions of the motor, engage contact fingers 42 and 39. The latter fingers are connected by means of conductors 65 and 64 and conductors 67 and 66 to the respective operating coils 69 and 68 of the reverser switches 22 which are of the type having permanent "on" positions. In the braking positions of the controller, segments 70 are used for energizing the reverser switch coil 68 and 69. In Fig. 2, the controller is shown in the "off" position. Four series control positions or notches 1 to 4, inclusive, four parallel positions 1' to 4', inclusive, and six brake positions 1'' to 6'', inclusive, are provided. The dead man's handle is so constructed that it can only be depressed to close the switch 57 when the controller handle is in the off position.

The controller is further provided with two segments 74 and 75 through which the energization of the operating coil of the line switch 15 is effected. One of these segments is rigidly mounted on the controller drum while the other is loose thereon but is caused to move with the fixed segment by reason of a projecting contact 76 and an insulated projection 77 on the segment 74 cooperating with a projecting contact on the segment 75. The arrangement is such that when the controller is moved from the off position, the contact projections 76 and 78 are in engagement with one another and that when the controller is moved from any position towards the off position said contacts separate. The segments 74 and 75 engage the contact fingers 44 and 45 in all the motoring positions of the controller. However, the segment 75 engages its finger a little in advance of the contact segment 74 and the latter has connected to it a small segment 79 which is adapted to make preliminary contact with the finger 43 in advance of segment 74 and simultaneously with the engagement of the segment 75 with the finger 45.

The finger 45 is connected by a conductor 80 to the coil of the line switch. The finger 44 is connected by a conductor 81 with the contact of the line switch 15 which is "dead" when said switch is open. In this manner, the line switch is initially energized through the dead man's handle, reverser contact 54 or 55, interlock contact 56, fingers 43, segments 79, 74 and 75, contact finger 45 and conductor 80. This energization occurs just before the controller reaches its first notch, namely, series position 1. However, as soon as the controller fully reaches the first notch, the shorter segment 74 engages finger 44 which is now connected directly to the trolley 5 since the line switch 15 is closed.

If it is desired to operate the motors 1 and 2 in a forward direction, then the reversing switch is set in the forward position, that is, the segments 54 and 56 are positioned to bridge the respective pairs of contact fingers 49 and 50, and 46 and 47. When the reverser switch is in this position, the dead man's switch may be closed and two parallel circuits established, one of which extends from the conductor designated as "To Trolley", through contacts fingers 52 and 51— bridged by the switch 57—conductor 82, operating coil 83 for switch 23, and the operating coil 84 for the switch 24 to ground 91, and the other of which circuits extends from contact segment 54 through conductor 58, contact fingers 40 and 42 bridged by contact segments 60 and 61, conductor 67, and operating coils 69 for the switches 22 to ground. Therefore, switches 23 and 24 are actuated to their upper or motoring positions by the coils 83 and 84, and the switches 22 are actuated to their upper or forward positions.

If the controller be now moved towards position 1, then the projection or lug 78 of segment 75 will engage the projection or lug 77 of segment 74 whereby these segments are connected together in current conducting relation to each other. As the controller is moved further toward position 1, segment 79, which is connected to segment 74, and segment 75 will engage contact fingers 43 and 45 substantially simultaneuosly whereby a circuit for the operating coil of the line switch 15 is established. This circuit extends from the conductor "To Trolley" through contact fingers 52 and 51—bridged by the switch 57—contact fingers 47 and 46 bridged by contact segment 56, contact fingers 43 and 45 bridged by segments 79, 74 and 75, conductor 80, and the operating coil of line switch 15 to ground at 91.

When the controller is finally set in position 1, the series position, then fingers 44 and 45 are bridged by the segments 74 and 75, whereby a holding circuit is established for the operating coil of the line switch 15, and contact fingers 31, 32, 34 and 47 are bridged by segment 53.

The holding circuit for the actuating coil of the line switch extends from the trolley 5 through the line switch 15, conductor 81, contact fingers 44 and 45—bridged by segments 74 and 75—conductor 80, and the operating coil of the line switch to ground at 91.

Since the segment 53 is connected to the trolley by means of the contact finger 31, which is electrically connected to the trolley 5 through contact segment 56 and the dead man's switch 57, the circuits established when the controller is set in the series position will be traced from segment 53.

The circuit established by the bridging of contact fingers 31 and 32 by the segment 53 extends from the trolley through contact finger 31 segment 53, contact finger 32, conductor 85, and operating coil 86 for the switch 14 to ground at 91.

The circuit that is established by the engagement of contact finger 34 by the segment 53 extends from the trolley through the segment 53, contact finger 34, conductor 89, operating coil 29 for the switch 16, operating coil 26 for the switch 17, and operating coil 27 for the switch 18 to ground at 91.

The circuit established by the engagement of contact 37 by the segments 53 extends from the trolley through the segment 53, contact finger 37, conductor 87 and the operating coil 88 of the switch 11 to ground at 91.

As shown by the sequence chart of Fig. 3, switches 15 and 11 and 14 and 16 will be closed, switches 17 and 18 will be closed in their lower circuit controlling positions, switches 23 and 24 will be closed in their upper circuit controlling positions, and the switches 22 will be closed in their forward circuit controlling positions, when the above-traced circuits, have been established. When the above-named switches have been closed a circuit is established (see Fig. 6) from the trolley 5 through resistance sections 8 and 9 in series, motor armature 1, field winding 3, motor armature 2, and field winding 4 to ground.

A holding circuit for the line switch coil is thus obtained which circuit, however, is broken as soon as the controller is moved from any of its motoring positions towards its off position by reason of the fact that the contact projections 76 and 78 separate and break the circuit. Furthermore, it will be realized that if the dead man's handle is released or if the supply fails the line switch is at once opened and it is only possible to reclose it by bringing the controller handle back beyond the first notch and this of course ensures that there is a safe amount of resistance in the motor circuit before the line switch is closed.

Upon the depression of the dead man's handle, another circuit is energized as follows, namely, from the contact finger 49 through a conductor 82 by means of which the respective coils 83 and 84 of the B and B' switches 23 and 24 are energized in series with one another. Such energization of the coils 83 and 84 causes the switches 23 and 24 to move to their upper positions thereby breaking the cross-field connection which obtained when the dead man's handle switch was not closed. Thus, by the depression of the dead man's handle, the connections are changed from those illustrated in Fig. 4 to those illustrated in Fig. 5. In this position, that is when the controller is in the off position and the dead man's handle is depressed, no braking is effected and no power is supplied to the motors and moreover coasting can be carried out. When the controller is in the off position, whether or not the dead man's handle is depressed, the motors are connected in parallel by reason of the fact that the M switch 17 and the G switch 18 are closed.

When the dead man's handle has been depressed and the controller is moved from the off position to the first notch, the drum segments 53, which are energized from the contact finger 31, engage at the same time the fingers 32, 34 and 37 which thus become energized. The finger 32 is connected to a conductor 85 by means of which the operating coil 86 of the resistance contactor switch 14, is energized. The contact finger 37 is connected to a conductor 87 by means of which the operating coil 88 of the resistance contactor 11 is energized. By the closure of the contractors 11 and 14, the resistance sections 8 and 9 in series are included in the motor circuit, thus providing a suitable value of resistance for starting. The contact finger 34 which is also energized on the first notch of the controller is connected to a conductor 89 by means of which the energization of the closing coil 29 of the JR switch (series connecting switch) the strong opening coil 26 of the M switch 17 and the weak opening coil 27 of the G switch 18 are energized, these three coils being connected in series.

Since the JR switch 16 and the M switch 17 are also mechanically interlocked, the energization of the coils 26 and 27 will maintain the closure of the JR switch 16 and lockout the M switch 17. The G switch 18 is similarly locked out, its opening coil being sufficiently strong for this purpose. The connections shown in Fig. 6 are thus obtained. Movement of the controller to the second, third and fourth notches results in the cutting out of resistance and in the obtaining of the connections shown in Figs. 7, 8 and 9 respectively, The sequence of operations will also be clear from the sequence chart in Fig. 3 which being of well known conventional form requires little explanation beyond the fact that the circles which contain a central dot indicate that the switches to which they pertain, namely the M and G switches, are in the upper positions, while the circles containing a cross indicate that these switches are in their lower positions.

On movement of the controller handle to the transition notch it will be seen by reference to the sequence chart, Fig. 3, that a certain amount of resistance is included in the circuit, whereupon the relatively weak closing coil of the M switch 17 and the relatively strong closing coil of the G switch 18 are energized through contact finger 35 of the master controller. The closing coil of the G switch 18 is so much stronger than its opening coil that the switch is immediately closed and by reason of the series coil a reliable contact and a desirable "knuckling" action is obtained. It will be seen by reference to Fig. 1 that when the G switch 18 closes as just above mentioned, the No. 1 motor is connected to ground and the No. 2 motor is short-circuited, this being the well known short circuit method of transition.

When the controller is moved through the transition notch to the first parallel notch, the circuit from contact finger 34 is broken and the JR switch 16 is opened by the coil 29 becoming de-energized. Simultaneously the opening coil of the M switch becomes de-energized, since it is in series with the coil 29 of the JR switch 16. Therefore, the closing coil 25 of the M switch is effective to close this switch. The motors are now connected in parallel with a suitable amount of resistance in circuit, as shown in Fig. 11. By further movement of the controller, the resistance value is reduced. In the present case, this is effected by changing the connections of the resistor sections. Thus, on the second parallel notch, resistor sections 9 and 10 are connected in parallel as shown in Fig. 12. In the third parallel notch of the controller, the three resistor sections are connected in parallel while, in the last parallel notch of the controller, the resistor is entirely cut out and the circuit is as shown in Fig. 13.

Controlled rheostatic braking is obtained by moving the main controller handle beyond the off position, that is to say in the reverse direction to that in which it is moved for motoring. All movement of the handle back from any motoring notch to the off position results in the circuit through the segments 74 and 75 being broken so that the line switch 15 is opened as previously described, all power being thus off from the motors. If the dead man's handle is still depressed, the coils of the B and B' contactor switches 23 and 24 are still energized so that, with the connections now obtaining, coasting may be carried out, such connections being such as to prevent the motors from building up and operating as generators. When movement is made, with the dead man's handle depressed, towards the first braking notch, the fields of the motors are reversed by means of the segment connections to contact fingers 39, 40, 41 and 42 which thus in effect constitute a reversing switch.

On the first brake notch, the circuit shown in Fig. 14 is obtained, all the resistance being inserted. On the second, third and fourth brake notches, the resistance is reduced, step by step until finally the sixth brake notch connections (Fig. 3) are obtained. In all the braking notches, parallel connection of the motors is obtained by the energization of contact fingers 35. In addition, contact finger 38 is energized throughout the whole of the braking notches so that the coils 90 and 80 of the MB and MB' switches 21 and 19 are energized, the closure of the MB' switch 19 connecting the brake coils in circuit, and closure of the MB switch 21 effecting the equalizing connections previously herein referred to. The MB' switch 19 is however already closed since it is interlocked with the line switch 15 which is now opened and the energization of its coil merely accentuates the closure.

In the system above described, if at any time the dead man's handle is released or if the power supply fails for any reason whatever, then the emergency braking connections shown in Fig. 4 are immediately and automatically obtained. When this occurs supply of control current to all of the switch coils is broken and the switches all open with the exception of the two-way switches which move to their lower positions. Thus the motors will be connected in parallel by the M and G switches 17 and 18 and the external circuit will be completed by the MB' switch 19. The external circuit will contain a suitable value of resistance to prevent unduly strong braking. The B and B' switches 23 and 24 will move into their lower positions and cause the motor fields to be cross-connected to provide the well known cross-field system of braking which is operative for either direction of running of the car. It will be necessary, even if the supply is immediately restored, to move the controller to the "off" position before the coil of the line switch can be re-energized. Consequently all the accelerating resistance must be in circuit before the closure of the line switch takes place.

It will thus be appreciated that even if the supply of power fails there is still an emergency system of braking which automatically comes into operation. The importance of this in multiple unit operation will also be appreciated.

With the above-described system, it will be seen that under normal operation, the car or cars will usually be brought to a standstill before the controller handle is released, and this is effected by rheostatic, electromagnetic, by hand or other mechanically-operated brakes. Hand or mechanically-operated brakes will usually be applied to hold the car on any particular gradient. However, it will be noticed that in the event of the failure of the mechanical braking, emergency brake connections are always available, so that the car will be prevented from running away backwards or forward, irrespective of the position of the reverser drum carrying segments 54 and 55, should such mechanical brakes fail to hold the car or become inoperative.

The handle of the master controller may be provided with a spring return device so that if released by the driver it will automatically move to its off position. With this arrangement the supply of control current from contact fingers 45 of the controller will be taken through an extra pair of fingers (not shown) on the dead man's handle switch.

Having now particularly described and ascertained the nature of my invention and in what manner the same may be performed, I claim as my invention:—

1. In an electric railway system, the combination with a pair of motors having series field-magnet windings, of control means comprising contactors for connecting said motors in series or parallel relation, and interlocking means for said contactors comprising operating coils connected in opposition to effect alternative operation of said contactors.

2. In an electric railway system, the combination with a pair of motors having series field-magnet windings, of controlling means therefor comprising contactors having runing and braking positions, and means for establishing braking connections through the field winding of one motor and the armature winding of the other motor when said running connection becomes ineffective.

3. In an electric railway system, the combination with a pair of motors having series field-magnet windings, of controlling means therefor comprising contactors having running and braking positions, and contactors, when in their braking positions, being adapted to cross-connect the motor field and armature windings, and means for establishing braking connection upon failure of power.

4. In an electric railway system, the combination with a pair of motors having series field-magnet windings, of control means comprising contactors for connecting said motors in series or parallel relation, and interlocking means for said contactors comprising relatively weak and strong operating coils connected in opposition to effect alternative operation of said contactors.

5. In an electric railway system, the combination with a pair of motors having series field-magnet windings, of control means comprising contactors, and interlocking means for said contactors comprising relatively weak and strong operating coils connected in opposition to effect alternative operation of said contactors.

In testimony whereof, I have hereunto subscribed my name this second day of June 1924.

NORMAN ENTWISLE NORTH.